(12) United States Patent
Peythieux et al.

(10) Patent No.: US 10,775,981 B2
(45) Date of Patent: Sep. 15, 2020

(54) DEVICE WITH A TOUCH-SENSITIVE DISPLAY COMPRISING A MECHANISM TO COPY AND MANIPULATE MODELED OBJECTS

(71) Applicant: Dassault Systemes, Velizy Villacoublay (FR)

(72) Inventors: Laura Peythieux, Boulogne Billancourt (FR); Amelie Renard, Issy les Moulineaux (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 562 days.

(21) Appl. No.: 14/569,359

(22) Filed: Dec. 12, 2014

(65) Prior Publication Data

US 2015/0177961 A1    Jun. 25, 2015

(30) Foreign Application Priority Data

Dec. 20, 2013   (EP) ..................................... 13306821

(51) Int. Cl.
- *G06F 3/0481* (2013.01)
- *G06F 3/0484* (2013.01)
- *G06F 3/0488* (2013.01)
- *G06F 3/041* (2006.01)

(52) U.S. Cl.
CPC .......... *G06F 3/04845* (2013.01); *G06F 3/041* (2013.01); *G06F 3/0488* (2013.01); *G06F 3/04842* (2013.01); *G06F 2203/04104* (2013.01)

(58) Field of Classification Search
CPC ...... G06F 3/041; G06F 3/0484; G06F 3/0488; G06F 3/04845; G06F 3/04842
USPC ........................................................ 715/765
See application file for complete search history.

(56) References Cited

U.S. PATENT DOCUMENTS

| | | |
|---|---|---|
| 2008/0068345 A1 | 3/2008 | Naganawa |
| 2009/0307589 A1 | 12/2009 | Inose et al. |
| 2011/0141043 A1* | 6/2011 | Soubrie ............... G06F 3/04883 345/173 |
| 2012/0162213 A1* | 6/2012 | Shim ..................... G06F 3/0416 345/419 |
| 2012/0226983 A1 | 9/2012 | Goldenberg et al. |

(Continued)

FOREIGN PATENT DOCUMENTS

| | | |
|---|---|---|
| JP | 2009294857 A | 12/2009 |
| WO | WO 2012/044805 | 4/2012 |

OTHER PUBLICATIONS

European Search Report for EP 13 30 6821 dated May 22, 2014.

*Primary Examiner* — Andrea C Leggett
(74) *Attorney, Agent, or Firm* — Hamilton, Brook, Smith & Reynolds, P.C.

(57) ABSTRACT

According to the invention, there is provided a computer-implemented method for duplicating a modeled object displayed on a touch screen and designing its duplicated version in a single gesture. The method comprises detecting (201) contact of an appendage within an activation zone associated to the first modeled object. If the contact is maintained more than a predetermined amount of time Tm (202), the method duplicates (203) the first modeled object into a second modeled object. The method, while maintaining contact between the appendage and the touch screen, performs at least one design operation (204) on the second modeled object depending of the movement of the appendage on the touch screen.

17 Claims, 4 Drawing Sheets

(56) References Cited

U.S. PATENT DOCUMENTS

2013/0113717 A1\* 5/2013 Van Eerd ............ G06F 3/04883
 345/173
2013/0212470 A1 8/2013 Karunamuni et al.

\* cited by examiner

DEVICE WITH A TOUCH-SENSITIVE DISPLAY COMPRISING A MECHANISM TO COPY AND MANIPULATE MODELED OBJECTS

RELATED APPLICATION

This application claims priority under 35 U.S.C. § 119 or 365 to European Application No. 13306821.3, filed Dec. 20, 2013. The entire teachings of the above application(s) are incorporated herein by reference.

BACKGROUND OF THE INVENTION

The invention relates to the field of computers programs and systems, and more specifically to the fields of touch-sensitive displays and man-machine interface.

The invention can be used in any interactive software or system in which manipulating modeled objects through touch-screen is required. In particular, the invention may be used in Computer-Aided Design software (CAD) or graphic design software.

In this description, the expression "modeled object" includes any virtual object that can be displayed to a user, including without limitation tri-dimensional objects, two-dimensional objects, drawings, digital images and the like.

SUMMARY OF THE INVENTION

Touch screens are commonly used in many electronic devices and systems to display text and/or modeled objects. They are also known as touch-screens, touchscreens or touch sensitive displays. The user is able to interact with a touch screen through a user interface comprising user interface objects. A touch screen device detects and responds to contact on the touch screen. Thus, the user is able to activate a function, trigger a process or manipulate modeled objects by contacting the touch screen with one finger, several fingers (multi-touch gesture) or a stylus at locations corresponding to the user interface objects he wants to interact with. A user interface object can be a soft key, a menu or a graphic.

When a user wants to copy a modeled object displayed on a first location and paste the duplicated version of the modeled object to a second location, the process involved can be split into three steps. The first step aims at selecting a modeled object, the second step implements the duplication of the selected object and the third step places the duplicated object on a second location.

If the user's device comprises a touch-screen and no keyboard or if the user is not in situation of taking advantage of an existing keyboard, the state-of-the-art copy and paste technique based on the Crtl+C and Ctrl+V keys actuation cannot be operated. This situation is encountered in particular with devices such as touchpads or tablets which can be operated by fingers or stylus.

If the user wants to copy and paste a modeled object, he will have to segment his action in several gestures which is neither natural nor productive. This issue will be encountered while using any kind of appendage including stylus or fingers.

Another well known technique, namely the "drag and drop" technique, allows the user to select a modeled object by grabbing it, dragging it toward a target location and dropping it there. However, this technique does not allow to copy and paste an object. Therefore, the user may have first to copy the object, and then he can drag and drop the duplicated version to a target location.

Additionally, the aforementioned techniques have the drawback of requiring an overloaded layout as well as many clicks and/or finger taps. A finger tap refers to the action of contacting the touch screen. This action is equivalent to a mouse click and a double tap may be equivalent to a double click depending on the interface. This skilled person will understand that the same actions can be carried out by using a stylus.

Moreover, the mouse distance which is the distance the mouse travels when using the touch screen device can be important. If a finger (respectively a stylus) is used instead of a mouse, the finger distance (respectively the stylus distance) will also be significant while using these techniques.

It would be desirable to address the above issues, to develop an ergonomic solution for copy and paste modeled objects on a touch screen device.

According to the invention, there is provided a computer-implemented method for duplicating a modeled object displayed on a touch screen and designing its duplicated version in a single gesture, the method comprising the steps of:
  detecting contact of an appendage within an activation zone associated to the first modeled object;
  if the contact is maintained more than a predetermined amount of time Tm, duplicating the first modeled object into a second modeled object; and
  while maintaining contact between the appendage and the touch screen, performing at least one design operation on the second modeled object depending of the movement of the appendage on the touch screen.

The method according to claim 1, wherein the activation zone is a bounding box.

In further aspects of the invention, the method comprises a step wherein the first modeled object is selected by pressing the activation zone with an appendage for more than a predefined amount of time Ts chosen such as Tm>Ts.

According to another aspect of the invention, a visual feedback is provided once the modeled object has been duplicated.

For example, the first modeled object flashes once duplicated.

Alternatively, the first modeled object is highlighted once duplicated.

In one embodiment, the activation zone flashes once the first modeled object has been duplicated.

In one embodiment, the at least one design operation is one or a combination of the following actions: shifting, re-scaling, rotation, reshaping or twisting.

In one aspect of the invention, the method comprises a step wherein it is detected if a contact is maintained in the activation zone associated to the second modeled object for more than another Tm period of time starting from the ending of the last design operation, a third modeled object being provided in that case.

The appendage is for example a stylus or a group of at least one finger.

According to the invention, there is also provided a computer program product, stored on a computer readable medium comprising code means for causing a computer to implement the method as described above.

According to the invention, there is also provided an electronic device comprising:
  at least one central processing unit,
  a touch screen device, a memory,
at least one module stored in the memory and configured for execution by the at least one central processing unit, the at least one module including instructions:
to detect contact of an appendage within an activation zone associated to the first modeled object;
if the contact is maintained more than a predetermined amount of time Tm, to duplicate the first modeled object into a second modeled object; and
while maintaining contact between the appendage and the touch screen, to perform at least one design operation on the second modeled object depending of the movement of the appendage on the touch screen.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

A better understanding of the embodiments of the present invention can be obtained from the following detailed description in conjunction with the following drawings, in which.

DETAILED DESCRIPTION OF THE INVENTION

A description of example embodiments of the invention follows.

The teachings of all patents, published applications and references cited herein are incorporated by reference in their entirety.

The modeled object is related to a physical product to be manufactured in the real world subsequent to the completion of its virtual design with a CAD solution. This physical product may be an industrial product such as a mechanical product, for instance a mechanical part but not limited to. A CAD solution allows the design of products in various and unlimited industrial fields: aerospace, architecture, construction, consumer goods, high-tech devices, industrial equipment, transportation, marine, offshore or transportation.

The user of a touch screen device according to the invention may make contact with the touch screen using any suitable appendage. As an example, a pointing device can be used as an appendage. Alternatively, one or several fingers may be used as an appendage for interfacing with the touch screen device.

In this description, a gesture refers to a motion of an appendage making contact with the touch screen. In other words, a gesture corresponds to a motion sequence which begins when the user makes contact with the touch screen by means of an appendage and which ends when he lifts the said appendage.

In the following description, one or several fingers are used as an appendage. However, it will be apparent to one of ordinary skill in the art that the present invention may be practiced by using other kind of appendages.

FIGS. 1A-1E illustrate gestures which can be used for interacting with a modelled object displayed by a touch screen device.

Figure 1A:
FIGS. 1A-1E illustrate gestures which can be used for interacting with a modelled object displayed by a touch screen device.

FIG. 1A represents a pinch and stretch action allowing for example to zoom in or out.

Figure 1B:
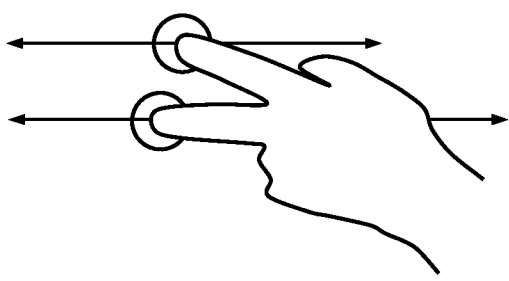

FIG. 1B represents a slide gesture with two fingers allowing for example to translate a modeled object.

Figure 1C:
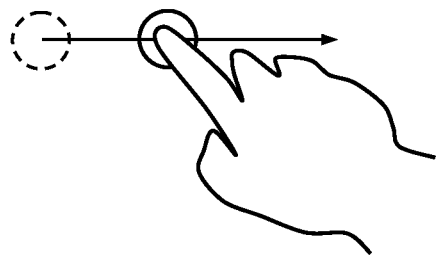

FIG. 1C represents a slide gesture with one finger allowing for example a translation in depth of a modeled object.

Figure 1D:
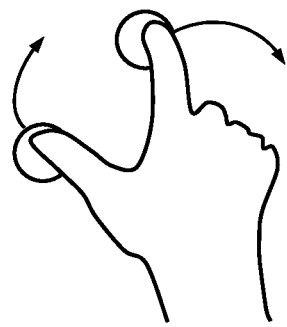

FIG. 1D represents a gesture allowing rotating a displayed modeled object. For that purpose, two fingers are placed on the modeled object and the hand is then turned.

Figure 1E:
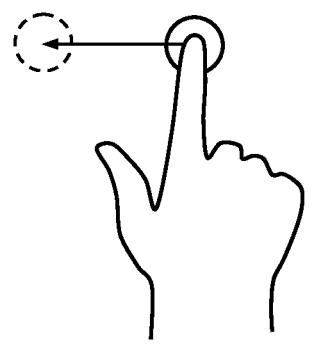

FIG. 1E represents a gesture allowing copying a modeled object, to drag a duplicated version towards a target location and to drop it there. For that purpose, the touch screen device is adapted so that it implements the method according to the invention.

Figure 2:
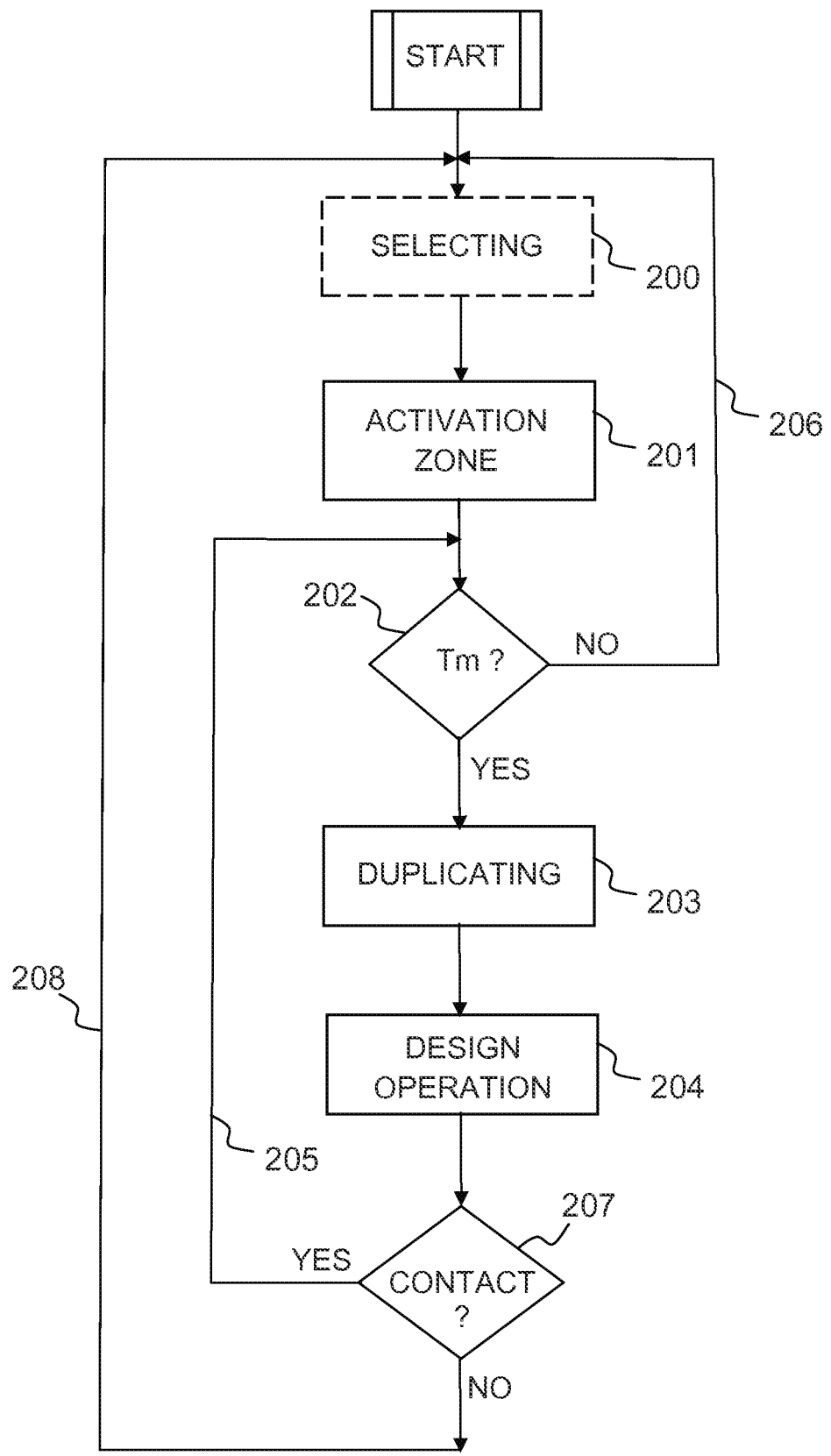
FIG. 2 is a flow diagram illustrating a method for copying a modeled object displayed on a touch screen and then performing a design operation on a duplicated version of the said object.

FIG. 2 is a flow diagram illustrating a method for copying a modeled object displayed on a touch screen and then performing a design operation on a duplicated version of the said object.

The displayed object is first selected 200, for example by pressing an activation zone with an appendage. An activation zone is a geometric figure associated to the modeled object defining an area located around/near the modeled object and which can be displayed or hidden. As an example, the activation zone may surround the modeled object. A bounding box can be used for that purpose. In a preferred embodiment, a modeled object is selected if its associated activation zone is pressed for more than a predefined amount of time Ts.

The method according to the invention does not necessarily include a step 200 for selecting the modeled object. If the object is already selected, the method according to the invention can be implemented by applying the steps as described below.

When a modeled object is selected, it is then checked 201 if there is a contact inside the activation zone, or if the contact is maintained in case the aforementioned selection step 200 has been applied just before.

Next step 202 determines if the contact is maintained more than a predetermined amount of time Tm. In case step 200 is applied, Tm is chosen such that Tm>Ts.

If no 206, the process restarts from the beginning. If yes, the selected modeled object is duplicated 203.

In one embodiment, a visual feedback is provided once the modeled object has been duplicated. For example, once duplicated, the modeled object may flash or be highlighted.

Alternatively, the visual feedback can be provided by the activation zone associated to the modeled object.

One or several design operation 204 is then applied to the duplicated modeled object. Different kind of design operations may be considered in the scope of this invention, including without limitation: shifting, re-scaling, rotation, reshaping or twisting. The skilled person will appreciate that a wide variety of design operation can be considered in the scope of this invention.

As an example, the duplicated modeled object can be shifted by simply dragging it and dropping it at a location chosen by the user. In another example, the user can re-scale the size of the object and/or rotate it, and then move towards a chosen location to finally drop it there.

A major advantage of the invention is that the user can duplicate and apply at least one design operation to a modeled object in a single gesture. If a selection step is implemented as described before, the user can select, duplicate and apply at least one design operation to the modeled object in a single gesture. In other words, the a sequence comprising a plurality of operations can be carried out without lifting the appendage from the touch screen. This involves a significant productivity gain for designers.

In one embodiment, once the design operation has been applied 204, a step 207 is carried out to detect if a contact is maintained in the activation zone associated to the duplicated modeled object. If yes, it is checked 205, 202 if this contact is maintained another Tm period of time, starting from the ending of the last design operation 204. In that case, a duplicated modeled object can be in turn duplicated and modified.

If more than a single duplication is carried out by the user, the first modeled object which is duplicated is taken as the reference for generating the subsequent duplicated versions.

Alternatively, the last duplicated version can be used as a reference for the subsequent duplication. In one aspect of the invention, if a design operation has been applied to the last duplicated version, it can be taken into account for the subsequent duplication.

Advantageously, the method according to the invention allows the user to perform a sequence of duplications and design operations in a single gesture.

For example, if a railway carriage is designed by means of a CAD software implementing the method according to the invention, a plurality of windows can be can be added to the design in a single gesture by applying the method to a first modeled window. Moreover, the duplicated windows are not necessarily the same as one or several design operation can be applied to each of the duplicated versions of the initially modeled window.

Figure 3A:
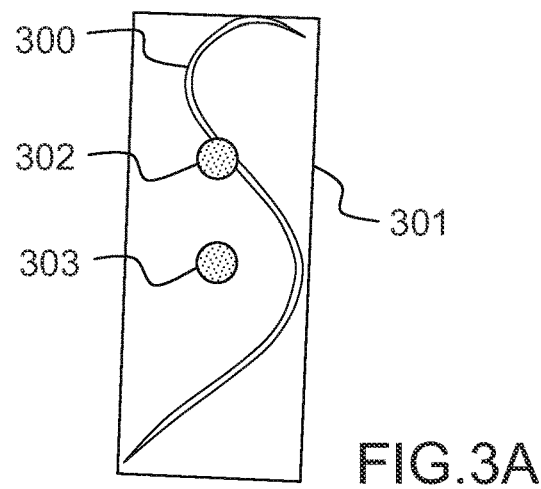
FIGS. 3A-3C illustrate how a curve can be duplicated and then dragged and dropped in a single gesture.
Figure 3B:
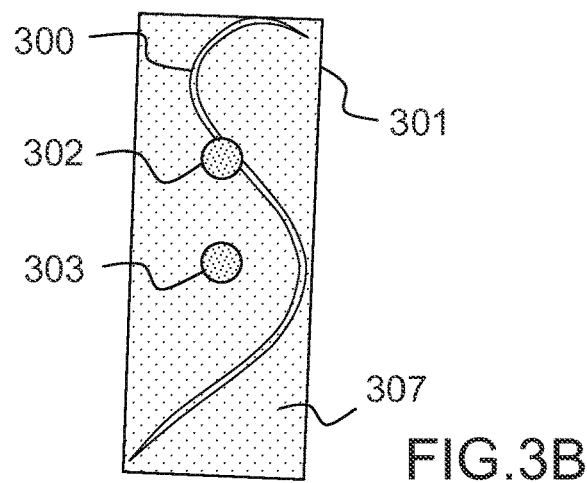
Figure 3C:
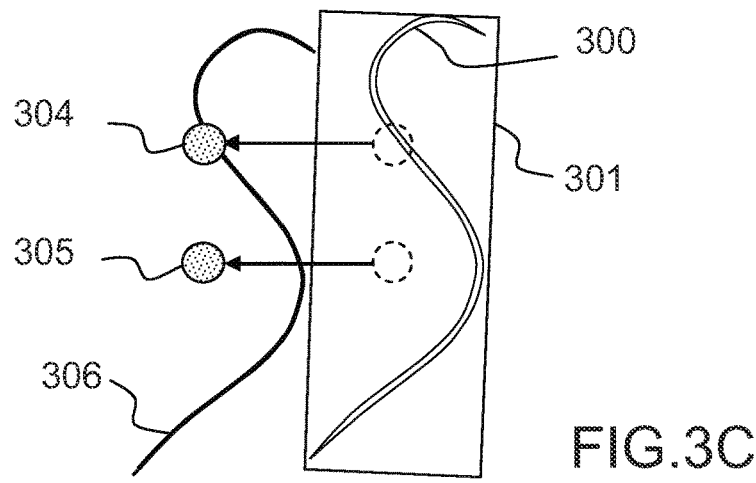

FIGS. 3A-3C illustrate how a curve can be duplicated and then dragged and dropped in a single gesture.

FIG. 3A shows a bi-dimensional curve 300 which is taken as an example of a modeled object a user wants to duplicate. For that purpose, he presses two fingers in the activation zone 301 associated to the selected curve 300. In this example, the activation zone is a bounding box.

The touch screen device detects that a contact 302, 303 with two fingers is maintained for a time greater or equal to Tm. Therefore, the curve 300 is duplicated and a visual feedback 307 is provided indicating that the duplication has occurred (see FIG. 3B).

Then, the user drag his two fingers 304, 305 toward the place where he wants to paste the duplicated curve (see FIG. 3C). At this stage, he can either drop the duplicated curve by lifting his fingers or applying a design operation on this curve. The can also maintain his fingers another Tm time if he wants to duplicate the modeled object again.

Therefore, the user is able to perform a sequence of operation in a single gesture. This means that the said sequence of operations can be carried out without lifting the appendage from the touch screen.

Figure 4:
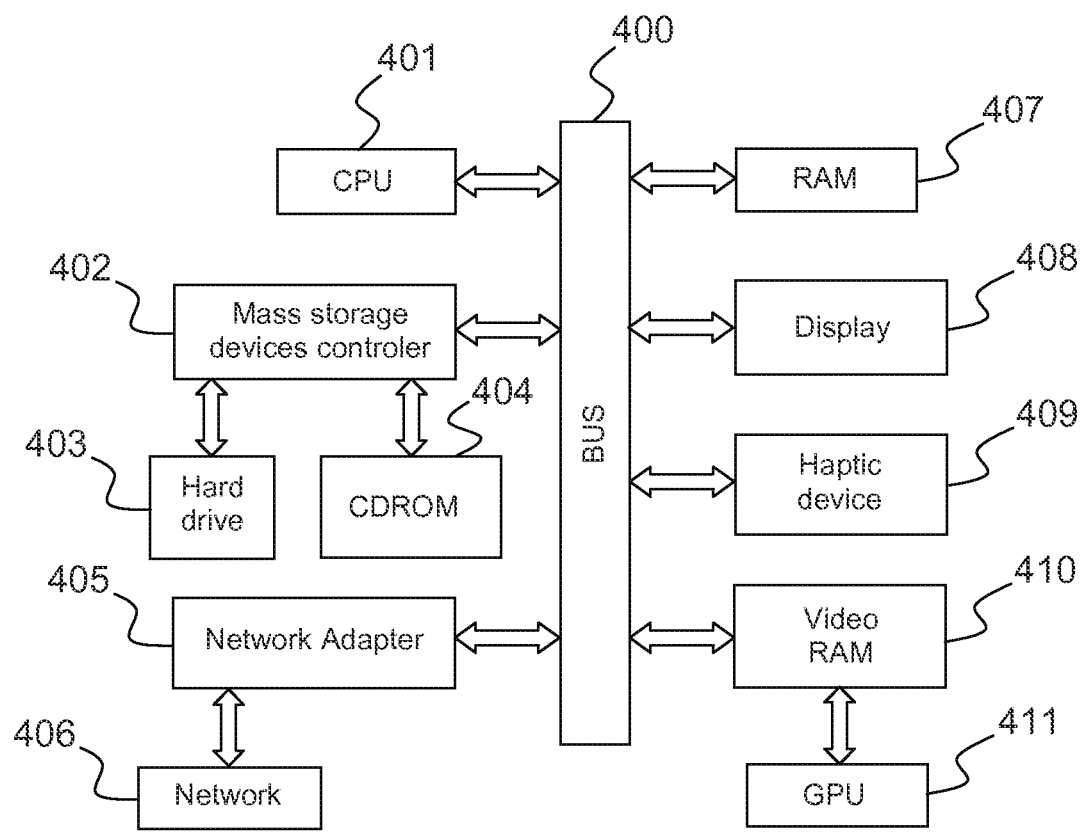
FIG. 4 provides an example of a touch screen device.

FIG. 4 provides an example of a touch screen device. The client computer comprises a central processing unit (CPU) 401 connected to an internal communication BUS 900, a random access memory (RAM) 407 also connected to the BUS. The touch screen device is further provided with a graphical processing unit (GPU) 411 which is associated with a video random access memory 410 and a touch screen (not represented). Video RAM 410 is also known in the art as frame buffer. A mass storage device controller 402 manages accesses to a mass memory device, such as hard drive 403. Mass memory devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks 404. Any of the foregoing may be supplemented by, or incorporated in, specially designed ASICs (application-specific integrated circuits). A network adapter 405 manages accesses to a network 406. The touch screen device may also include a haptic device 409 such as cursor control device, a keyboard or the like. A cursor control device is used in the touch screen device to permit the user to selectively position a cursor at any desired location on display 408. In addition, the cursor control device allows the user to select various commands, and input control signals. The cursor control device includes a number of signal generation devices for input control signals to system. Typically, a cursor control device may be a mouse, the button of the mouse being used to generate the signals.

The methods and apparatus described are merely exemplary and the skilled person would appreciate that a number of alternatives exist to implement aspects of the invention. Embodiments of the invention may be also used in a wide variety of applications and contexts, wherever a touch screen interface may be required. It will also be apparent to the skilled person that various sequences and permutations on the methods and device described are possible within the scope of this invention as disclosed.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method for duplicating a first three-dimensional modeled object displayed on a touch screen and designing its duplicated version in a single gesture, the method comprising the steps of:
   detecting contact of an appendage within an activation zone associated to the first three-dimensional modeled object;
   if the contact is maintained more than a predetermined amount of time ($T_m$), duplicating the first three-dimensional modeled object into a second three-dimensional modeled object;
   while maintaining contact between the appendage and the touch screen, performing at least one design operation on the second three-dimensional modeled object depending of the movement of the appendage on the touch screen; and
   detecting whether the contact is maintained in the activation zone associated to the second three-dimensional modeled object for more than another amount of time ($T_m$) starting after the last design operation, and if the contact is maintained, providing a third modeled object that is duplicated based on one or more of the first three-dimensional modeled object and the second three-dimensional modeled object;
   wherein the at least one design operation is one or a combination of the following actions: re-scaling, rotation, reshaping or twisting.

2. The method according to claim 1, wherein the activation zone is a bounding box.

3. The method according to claim 1 further comprising a step wherein the first three-dimensional modeled object is selected by pressing the activation zone with an appendage for more than a predefined amount of time ($T_s$) chosen such as $T_m > T$.

4. The method according to claim 1, wherein a visual feedback is provided once the three-dimensional modeled object has been duplicated.

5. The method according to claim 4, wherein the first three-dimensional modeled object flashes once duplicated.

6. The method according to claim 4, wherein the first three-dimensional modeled object is highlighted once duplicated.

7. The method according to claim 4, wherein the activation zone flashes once the first three-dimensional modeled object has been duplicated.

8. The method according to claim 1, wherein the appendage is a stylus.

9. The method according to claim 1, wherein the appendage is a group of at least one finger.

10. A computer program product, comprising:
a non-transitory computer readable medium comprising code means for causing a computer to implement duplicating a first three-dimensional modeled object displayed on a touch screen and designing its duplicated version in a single gesture; the code means including instructions causing the computer to:
detect contact of an appendage within an activation zone associated to the first three-dimensional modeled object;
if the contact is maintained more than a predetermined amount of time ($T_m$), duplicate the first three-dimensional modeled object into a second three-dimensional modeled object;
while maintaining contact between the appendage and the touch screen, perform at least one design operation on the second three-dimensional modeled object depending of the movement of the appendage on the touch screen; and
detect whether the contact is maintained in the activation zone associated to the second three-dimensional modeled object for more than another amount of time ($T_m$) starting after the last design operation, and if the contact is maintained, provide a third modeled object that is duplicated based on one or more of the first three-dimensional modeled object and the second three-dimensional modeled object;
wherein the design operation comprises at least one of the following actions: re-scaling, rotation, reshaping or twisting, or a combination thereof.

11. An electronic device comprising:
at least one central processing unit;
a touch screen device operatively coupled to the at least one central processing unit;
a memory associated with the at least one central processing unit; and
at least one module stored in the memory and configured for execution by the at least one central processing unit, the at least one module including instructions:
to detect contact of an appendage within an activation zone associated to a first three-dimensional modeled object;
if the contact is maintained more than a predetermined amount of time ($T_m$), to duplicate the first three-dimensional modeled object into a second three-dimensional modeled object; and
while maintaining contact between the appendage and the touch screen, to perform at least one design operation on the second three-dimensional modeled object depending of the movement of the appendage on the touch screen; and
detect whether the contact is maintained in the activation zone associated to the second three-dimensional modeled object for more than another amount of time ($T_m$) starting after the last design operation, and if the contact is maintained, provide a third modeled object that is duplicated based on one or more of the first three-dimensional modeled object and the second three-dimensional modeled object;
wherein the design operation comprises at least one of the following actions: re-scaling, rotation, reshaping or twisting, or a combination thereof.

12. The electronic device as claimed in claim 11, wherein the activation zone is a bounding box.

13. The electronic device as claimed in claim 11, wherein the at least one module further includes instructions wherein the first three-dimensional modeled object is selected 200 by pressing the activation zone with an appendage for more than a predefined amount of time ($T_s$) chosen such as $T_m > T_s$.

14. The electronic device as claimed in claim 11, wherein a visual feedback is provided once the modeled object has been duplicated.

15. The electronic device as claimed in claim 14, wherein the first three-dimensional modeled object either flashes once duplicated, or is highlighted once duplicated.

16. The electronic device as claimed in claim 14, wherein the activation zone flashes once the first three-dimensional modeled object has been duplicated.

17. The electronic device as claimed in claim 11, wherein the appendage is one of a stylus and a group of at least one finger.

* * * * *

UNITED STATES PATENT AND TRADEMARK OFFICE
CERTIFICATE OF CORRECTION

PATENT NO. : 10,775,981 B2
APPLICATION NO. : 14/569359
DATED : September 15, 2020
INVENTOR(S) : Laura Peythieux and Amelie Renard It is certified that error appears in the above-identified patent and that said Letters Patent is hereby corrected as shown below:

In the Claims

In Claim 3, Column 7, at Line 5, delete "$T_m > T$." and insert -- $T_m > T_s$. --.

Signed and Sealed this
Tenth Day of November, 2020

Andrei Iancu
*Director of the United States Patent and Trademark Office*